No. 776,102. PATENTED NOV. 29, 1904.
P. A. M. ARNBERG.
LINER FOR CENTRIFUGAL SEPARATORS.
APPLICATION FILED MAR. 6, 1903.
NO MODEL.
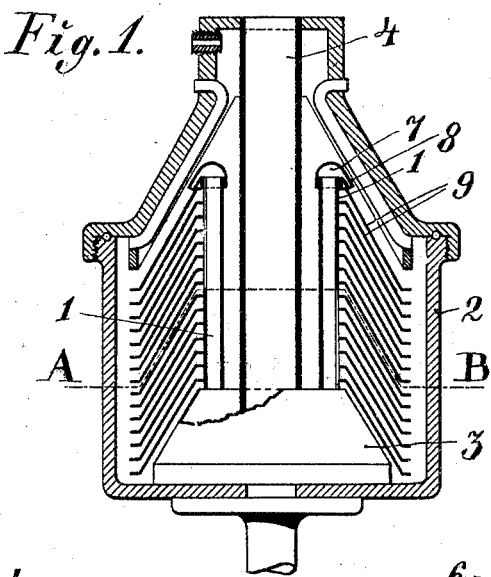
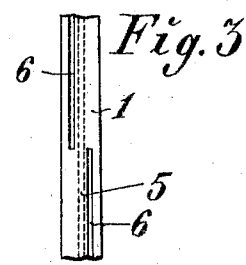
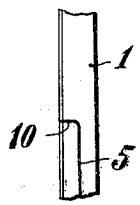
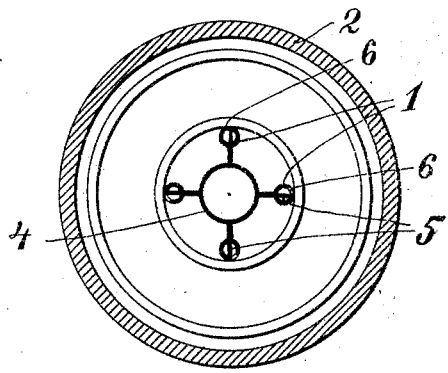
Witnesses
Evald Delmar
Inventor
Per A. M. Arnberg
by Olof Dahl
his att'y No. 776,102. Patented November 29, 1904.

UNITED STATES PATENT OFFICE.

PER AXEL MAURITZ ARNBERG, OF STOCKHOLM, SWEDEN, ASSIGNOR TO NYA AKTIEBOLAGET RADIATOR, OF STOCKHOLM, SWEDEN, A STOCK COMPANY.

LINER FOR CENTRIFUGAL SEPARATORS.

SPECIFICATION forming part of Letters Patent No. 776,102, dated November 29, 1904.

Application filed March 6, 1903. Serial No. 146,551. (No model.)

*To all whom it may concern:*

Be it known that I, PER AXEL MAURITZ ARNBERG, a subject of the King of Sweden and Norway, and a resident of Stockholm, Sweden, have invented new and useful Improvements in Liners for Centrifugal Separator-Drums, of which the following is a specification, reference being had to the drawings accompanying and forming a part hereof.

This invention relates to improvements in liners for centrifugal separator-drums, and more especially to liners which consist of conical plates which radially divide the contents of the drum into thin layers.

In liners for centrifugal drums, especially such consisting of a number of conical mantles arranged above one another, there has been used vertical or approximately vertical distributing-pipes communicating with the usual central inlet-pipe and provided on their outer sides with outlet-openings in order to uniformly distribute the liquid along the whole height of the liner, or the central inlet-pipe has been provided with radial or approximately radial flanges having outlet-openings in the shape of slots, holes, or the like. Such devices have, however, the disadvantage that the milk on account of gravity is thrown out by the centrifugal force through the outlet-openings of the said distributing-pipes or the central inlet-pipe principally at the lower part of the liner, whereby the milk is not distributed as uniformly as desired.

The object of this invention is therefore to obviate the said disadvantage.

The present invention consists principally in providing the outlet-openings of the different distributing pipes or tubes in different levels—for instance, in such manner that some of the said pipes or tubes are provided with outlet-openings only at their lower parts and the other pipes or tubes with outlet-openings only at their upper parts.

A suitable way of carrying out my invention consists in dividing the distributing pipes or tubes or the central inlet-pipe by means of division-walls in two or more chambers, the outlet-openings of which are situated at different levels, so that the milk will flow on different ways to the outlet-openings situated in different levels. If in this arrangement the milk, for instance, is let into the said distributing-pipes from below, the milk entering in a chamber having outlet-openings only in its upper part will be forced to flow up to the said upper part, whereby thus some of the milk entering a distributing-pipe will be prevented from being thrown out at the lower part of the same, which will result in a more uniform distribution of the milk in the liner than what has heretofore been the case.

In the accompanying drawings I have shown two embodiments of my invention.

Figure 1 shows a central vertical section of a centrifugal separator-drum having a liner constructed in accordance with my present invention. Fig. 2 shows a section on line A B in Fig. 1. Fig. 3 shows in elevation and on an enlarged scale a part of a distributing pipe or tube; and Fig. 4, a vertical section, likewise on an enlarged scale, of a modified arrangement of a division-wall.

Referring to the drawings, the distributing pipes or tubes 1 are arranged in the well-known manner, so that they will let out the full milk outside or at the outer side of the cream-wall. If the full milk is to be let into the said distributing-pipes from below, the said pipes may, as shown in Fig. 1, be arranged in open communication with a distributing conical vessel 3, arranged in the usual manner on the bottom of the centrifugal separator-drum 2, into which the full milk is introduced by means of a usual central inlet-pipe 4. As shown in Figs. 2 and 3, each distributing-pipe 1 is provided with a vertical division-wall 5, which divides the pipe in two separate chambers, the outlet-openings 6 of which are situated at different levels, as clearly shown in Fig. 3. By this arrangement the milk rising into a distributing-pipe 1 will be divided into two currents, of which the one that rises in the left half of the distributing-pipe (shown in Fig. 3) obviously cannot leave the distributing-pipe until it arrives to the upper part of the same. If the division-wall 5 divides the pipe in two like parts, it is obvious that like quantities of milk will rise in the chambers of the pipe and that thus practically like quantities of milk will be thrown out into the upper and the lower part of the liner, provided that the two outlet-openings 6 are of the same dimensions. The rising of the milk in the distributing-pipes 1 may, as shown in Fig. 1, be aided by the arrangement at the top of the distributing-pipes of small caps 7 or the like provided with outlet-pipes 8, which lead out the milk between the two uppermost conical mantles 9 of the liner, so that the milk, apart from the effect of the centrifugal force, will be given a certain tendency to flow upward in the distributing-pipes, which will cause a more uniform distribution of the full milk over the whole liner.

Instead of providing the distributing pipes or tubes with two or more outlet-openings 6, displaced in relation to each other and arranged at different levels, as described above, the said distributing-pipes may in well-known manner be provided with a single outlet-slot running along the whole length of the same, as shown in Fig. 4. The division-walls need, of course, in this case not extend through the whole length of the distributing-pipe. If only one division-wall be used, it may reach to the half-height of the pipe, or approximately so. If two division-walls be used, the one may extend through one-third of the pipe, or approximately so, and the other through two-thirds of the same, and so on. In this case the division-walls may at their upper ends preferably be bent horizontally toward the outlet-slot, as illustrated at 10 in Fig. 4, so that the distributing-pipes also in this case will be divided in two or more chambers separated from each other and having their outlet-openings at different levels. The result of the division-walls described above will nevertheless be the same.

Though the distributing-pipes in the centrifugal separator-drum shown in the drawings are arranged at a larger radial distance from the geometric axis of the drum than that of the wall of cream, they may also be placed, for instance, at such radial distance from the geometric axis of the drum that they during the rotation of the drum will stand in the room within the liquid-cylinder formed by the wall of cream during the rotation of the drum, the distributing-pipes being in this case provided with hollow flanges projecting radially through the wall of cream and having suitable outlet openings or slots. My present invention may also be carried out in such manner that a number of the distributing-pipes are provided with outlet-openings at lower levels, while other distributing-pipes in the same liner are provided with outlet-openings at other levels, as will be understood by those skilled in the art to which this invention appertains.

Obviously the shape of the outlet-openings of the distributing-pipes is inessential for the invention. Though the distributing-pipes shown in the drawings are provided with longitudinally-running slots, the invention is applicable also to distributing-pipes having outlet-openings in the shape of fine holes or the like.

In central inlet-tubes having radially-projecting flanges provided with outlet-openings the arrangement of the division-walls illustrated in Figs. 1 to 3 may preferably be employed for dividing the inlet-tube in two or more chambers separated from each other.

Having now particularly described my invention and in what manner the same may be performed, what I claim as new, and desire to secure by Letters Patent, is—

1. In a centrifugal separator-drum the combination of, a liner consisting of conical plates arranged above one another, and distributing-pipes having outlet-openings at different levels, substantially as and for the purpose set forth.

2. The combination with a centrifugal separator-drum having a liner consisting of conical plates arranged above one another of, distributing-pipes, division-walls in said distributing-pipes dividing the latter in chambers separated from each other, the said distributing-pipes being provided with outlet-openings situated at different levels in the different chambers, substantially as and for the purpose set forth.

3. The combination with a centrifugal separator-drum of a liner consisting of conical plates arranged above one another, distributing-pipes, division-walls in said distributing-pipes dividing the latter in chambers separated from each other the said distributing-pipes being provided with outlet-openings situated at different levels in the different chambers, caps on the upper ends of the said distributing-pipes, and outlet-pipes on said caps, substantially as and for the purpose set forth.

4. In a centrifugal separator-drum the combination of a liner consisting of conical plates arranged above one another, distributing-pipes having outlet-openings at different levels, caps on the upper ends of said distributing-pipes, and outlet-pipes on said caps, substantially as and for the purpose set forth.

5. In a centrifugal creamer, an orificed inlet and distributing device extending vertically through the liquid-space of the bowl, the orifice extending over a portion only of the vertical height of said device.

In testimony whereof I have signed my name to this specification in the presence of two subscribing witnesses.

PER AXEL MAURITZ ARNBERG.

Witnesses:
 JOHN DELMAR,
 KARL RUNCSKOOF.